(12) United States Patent
Skaradzinski

(10) Patent No.: US 8,342,588 B2
(45) Date of Patent: Jan. 1, 2013

(54) INSULATED COMPOSITE BODY PANEL STRUCTURE FOR A REFRIGERATED TRUCK BODY

(75) Inventor: Dennis Joseph Skaradzinski, Terre Haute, IN (US)

(73) Assignee: Martin Marietta Materials, Inc., Raleigh, NC (US)

( * ) Notice: Subject to any disclaimer, the term of this patent is extended or adjusted under 35 U.S.C. 154(b) by 672 days.

(21) Appl. No.: 11/626,626

(22) Filed: Jan. 24, 2007

(65) Prior Publication Data

US 2008/0174147 A1    Jul. 24, 2008

(51) Int. Cl.
| | |
|---|---|
| *B60P 3/20* | (2006.01) |
| *B62D 25/02* | (2006.01) |
| *E04B 2/00* | (2006.01) |
| *E04C 2/34* | (2006.01) |
| *B61D 17/00* | (2006.01) |
| *A47J 39/00* | (2006.01) |

(52) U.S. Cl. ............... 296/24.35; 296/186.1; 52/506.02; 52/794.1; 105/357; 220/592.27

(58) Field of Classification Search ......... 52/17, 506.02, 52/782.11, 783.1, 784.15, 407.5, 284; 62/245; 105/357; 296/24.35, 186.1, 182.1; 220/592.27
See application file for complete search history.

(56) References Cited

U.S. PATENT DOCUMENTS

| | | | | |
|---|---|---|---|---|
| 1,626,655 | A | * | 5/1927 | Woodson ...................... 52/404.1 |
| 2,189,126 | A | * | 2/1940 | Bonsall ......................... 52/404.1 |
| 2,779,066 | A | * | 1/1957 | Gaugler et al. ............... 312/406 |
| 3,990,872 | A | * | 11/1976 | Cullen ................................ 96/6 |
| 4,709,643 | A | * | 12/1987 | Moreno et al. ................ 110/336 |
| 4,957,521 | A | * | 9/1990 | Cullen et al. .................... 96/133 |
| 5,794,402 | A | | 8/1998 | Dumlao et al. |
| 5,881,459 | A | * | 3/1999 | Yasui .......................... 29/897.32 |
| 5,890,435 | A | | 4/1999 | Thoman et al. |
| 5,900,299 | A | * | 5/1999 | Wynne ............................ 428/69 |
| 5,992,117 | A | | 11/1999 | Schmidt |
| 6,023,806 | A | | 2/2000 | Dumlao et al. |
| 6,044,607 | A | | 4/2000 | Dumlao et al. |
| 6,108,998 | A | | 8/2000 | Dumlao et al. |
| 6,269,608 | B1 | * | 8/2001 | Porter ......................... 52/794.1 |
| 6,645,333 | B2 | | 11/2003 | Johnson et al. |
| 6,676,785 | B2 | | 1/2004 | Johnson et al. |
| 6,758,057 | B2 | * | 7/2004 | Vince et al. .................... 62/434 |
| 6,860,082 | B1 | * | 3/2005 | Yamamoto et al. .......... 52/794.1 |
| 2002/0148196 | A1 | | 10/2002 | Barry et al. |
| 2003/0196567 | A1 | * | 10/2003 | Norton et al. ................ 105/396 |
| 2004/0020236 | A1 | * | 2/2004 | Vince et al. .................... 62/434 |
| 2005/0055982 | A1 | * | 3/2005 | Medina ........................ 52/782.1 |
| 2005/0194381 | A1 | | 9/2005 | Zupancich et al. |
| 2007/0110944 | A1 | * | 5/2007 | Grandominico et al. ....... 428/57 |
| 2009/0031659 | A1 | * | 2/2009 | Kalfon ......................... 52/404.1 |
| 2009/0056237 | A1 | * | 3/2009 | Dickinson et al. ............. 52/79.5 |
| 2009/0071088 | A1 | * | 3/2009 | Viegas et al. ................. 52/406.1 |

* cited by examiner

*Primary Examiner* — Joshua J Michener
*Assistant Examiner* — Ryan Kwiecinski
(74) *Attorney, Agent, or Firm* — Nelson Mullins Riley & Scarborough LLP

(57) ABSTRACT

Various embodiments of the present invention provide an insulated structural panel including a superinsulating, desiccant-filled, vacuum-sealed insulating panel sandwiched between a pair of composite panels. The composite panels are configured to impart structural strength to the panel without introducing heat transfer pathways through the vacuum-sealed insulating panel. The desiccant material disposed within the vacuum-sealed insulating panel is capable of absorbing moisture within the vacuum established within the vacuum-sealed insulating panel and thereby reducing the degradation of the vacuum-sealed panel's insulating capacity.

24 Claims, 2 Drawing Sheets

INSULATED COMPOSITE BODY PANEL STRUCTURE FOR A REFRIGERATED TRUCK BODY

FIELD OF THE INVENTION

Various embodiments of the present invention are directed to a super-insulated composite structure for use as a component of a refrigerated truck body.

BACKGROUND OF THE INVENTION

The temperature regulation of refrigerated containers such as, for example, refrigerated truck bodies and trailers, is managed by providing a combination of cooling elements (such as refrigeration units and/or "cold plate" devices, for example) and insulated structural elements. The required cooling capacity of the cooling elements is largely dependent on the difference in temperature that must be maintained between the interior and exterior of the refrigerated container. Furthermore, the cost and complexity of the cooling system may be substantially reduced if the structure is thermally efficient (as quantified, for example, by a high "R" value). Thus, refrigerated containers are often constructed from components that serve both as structural components and insulating elements.

Conventional insulated structural elements utilized in refrigerated containers include a metal frame sandwiched between fiberglass layers. In order to provide insulation to the structure, foam is injected or blown into the space defined between the fiberglass layers. Such conventional insulated structures suffer from several technical deficiencies. First, the metal frame adds considerable weight to the assembly. The metal frame also creates significant heat transfer pathways or "thermal shorts" between the fiberglass layers that may degrade the overall R value of the structural element. In addition, conventional insulated structures also suffer from durability problems that cause the degradation of the structure's insulating capacity over time. For example, as conventional insulated structures are subjected to the everyday rigors of use and transport, the injected and/or blown foam layer tends to break apart, which may result in serious degradation of the R value of the structure.

Although conventional insulated structures suffer from the disadvantages outlined above, their use is still prevalent in refrigerated cargo and storage applications primarily due to availability, relative ease of assembly and low cost, and because the use of metal-reinforced fiberglass panels (having blown foam insulating filler) is relatively consistent and well-known. However, in light of the shortcomings of these conventional insulated structures, there exists a need in the art for an insulated structural element for use in refrigerated containers (such as, for example, refrigerated truck bodies and trailers) that is lightweight, durable, and provides a robust and thermally-efficient insulating capacity.

BRIEF SUMMARY OF THE INVENTION

Certain embodiments of the present invention satisfy the needs listed above and provide other advantages as described below. Embodiments of the present invention may include an insulated composite panel assembly for a refrigerated truck body (and/or other refrigerated container). According to one embodiment, the assembly comprises a first composite panel and a second composite panel disposed substantially parallel to and spaced apart from the first composite panel. The assembly also comprises a vacuum-sealed insulating panel operably engaged between the first composite panel and the second composite panel. The vacuum-sealed insulating panel comprises a desiccant material disposed within the vacuum-sealed insulating panel. Some embodiments may further comprise a polyurethane coating material disposed on an outer side of at least one of the first composite panel and the second composite panel.

In some embodiments, the vacuum-sealed insulating panel comprises a plurality of vacuum-sealed component elements. Furthermore, according to some such embodiments, each of the plurality of vacuum-sealed component elements may define at least one channel and at least one tab, such that the vacuum-sealed component elements may be operably engaged with one another to form a larger vacuum-sealed insulating panel. For example, in some embodiments, the tab of a first vacuum-sealed component element may be inserted into a corresponding channel of a second vacuum-sealed component element for form a substantially continuous and/or interconnected vacuum-sealed insulating panel.

Furthermore, according to some embodiments, the vacuum-sealed insulating panel may comprise a foam core material defining an aperture for retaining the desiccant material. The foam core material may comprise insulating materials that may include, but are not limited to: open cell polyurethane foam; polystyrene foam; carbon/silica aerogel; and combinations of such insulating materials. Furthermore, the desiccant material may comprise, for example, one or more silica gel packets. The vacuum-sealed insulating panel may also comprise a cover material configured to surround the foam core material. The cover material may comprise a variety of substantially gas-impermeable materials that may include, but are not limited to: a metallic film; a polymer laminate; and combinations of such substantially gas-impermeable materials.

The first composite panel and the second composite panels of the insulated composite panel assembly may comprise various types of structural composites that may include, but are not limited to: fiber reinforced polymer materials; fiber reinforced polymer composites; solid laminates; and combinations of such materials. In embodiments wherein at least one of the first and second composite panels comprise a fiber reinforced polymer composite, the fiber reinforced polymer composite may include, but is not limited to: a pultruded sandwich panel comprising an upper skin and a lower skin and a core disposed substantially between the upper and lower skins; a vacuum-infused sandwich panel comprising an upper skin and a lower skin and a core disposed substantially between the upper and lower skins; a pultruded panel comprising an upper skin and a lower skin and a web material disposed substantially between the upper and lower skins; and combinations of such fiber-reinforced polymer composites.

In order to securely and operably engage the various components of the insulated composite panel structure, some embodiments may further comprise an adhesive layer disposed between the vacuum-sealed insulating panel and at least one of the first composite panel and the second composite panel. The adhesive layer may include, but is not limited to a methacrylate adhesive and a contact adhesive (such as a spray-on contact adhesive, for example). Furthermore, in some embodiments, the insulated composite panel assembly further comprises at least one bracket extending substantially perpendicularly from at least one edge of the insulated composite panel assembly for receiving a side wall adapted to extend substantially perpendicularly from the insulated composite panel assembly. The bracket may, in some embodiments, be integrally formed with the insulated composite panel assembly. The bracket may comprise one or more composite materials that may include, but are not limited to: pultruded tubing materials; extruded composite tubing materials; composite tubing materials comprising a polyurethane matrix and a plurality of E-glass fibers disposed within the polyurethane matrix; and combinations of such materials. Furthermore the bracket may, in some embodiments, allow multiple insulated composite panel assemblies to be formed together to form a refrigerated truck body and/or other refrigerated container as part of a cargo vehicle. For example, some embodiments of the present invention provide an insulated structure comprising a floor comprising, for example, the insulated composite panel assembly described herein. Such insulated structure embodiments may further comprise a wall member comprising the insulated composite panel assembly described herein, wherein the wall member is operably engaged with the floor to form an integrated insulated structure.

Thus, the various embodiments of the insulated composite panel assembly of the present invention provide many advantages that may include, but are not limited to: providing an insulated structural assembly that is durable and lightweight; providing a insulating structural panel assembly having an insulating capacity (and/or R value) that degrades minimally during the product life of the assembly; and providing an insulated structural panel assembly that includes robust, vacuum-sealed insulating components that are less likely to decompose and/or break down during the rigors of use and transport.

These advantages, and others that will be evident to those skilled in the art, are provided in the various embodiments of the present invention.

BRIEF DESCRIPTION OF THE SEVERAL VIEWS OF THE DRAWINGS

Figure 1:
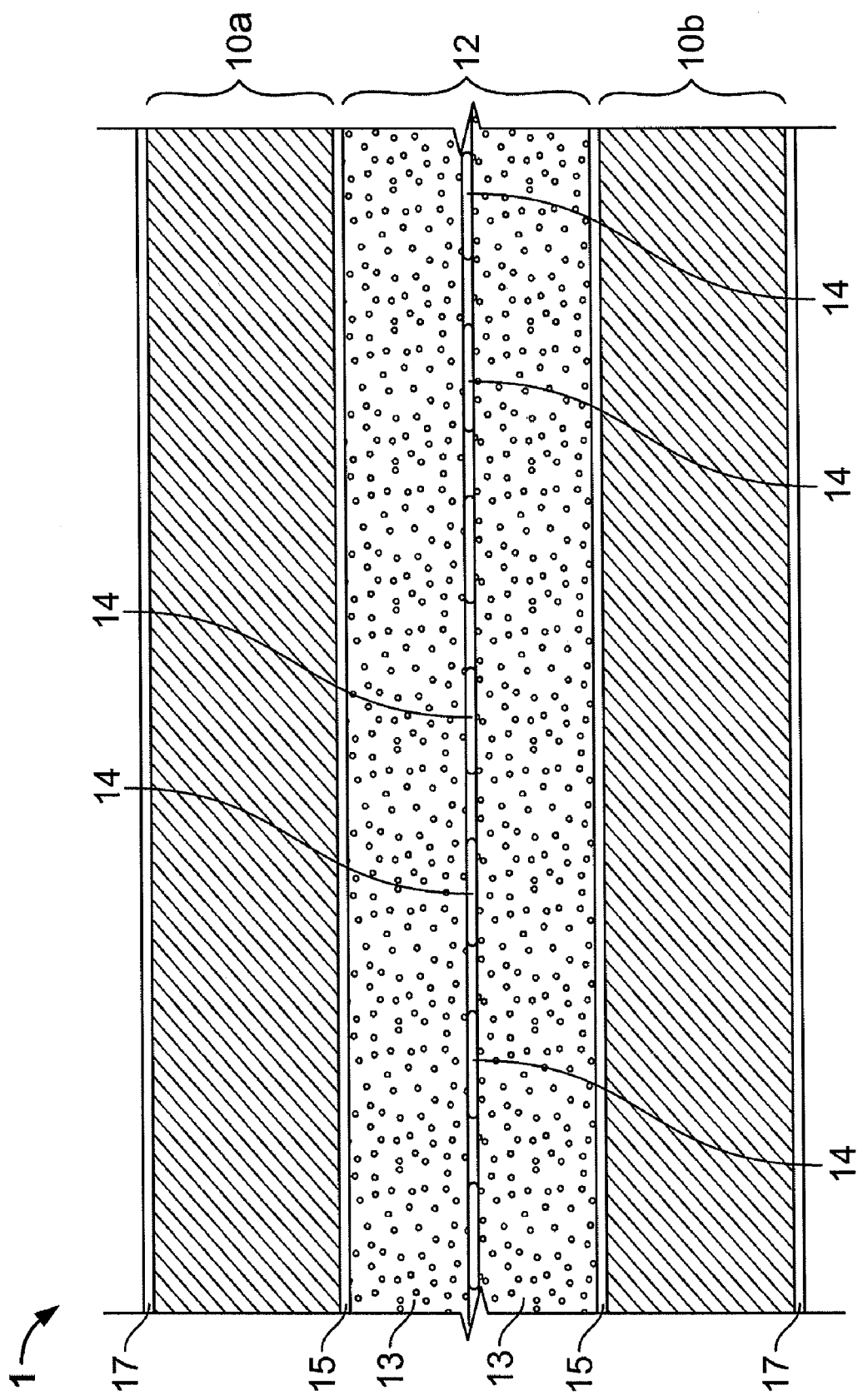
Figure 2:
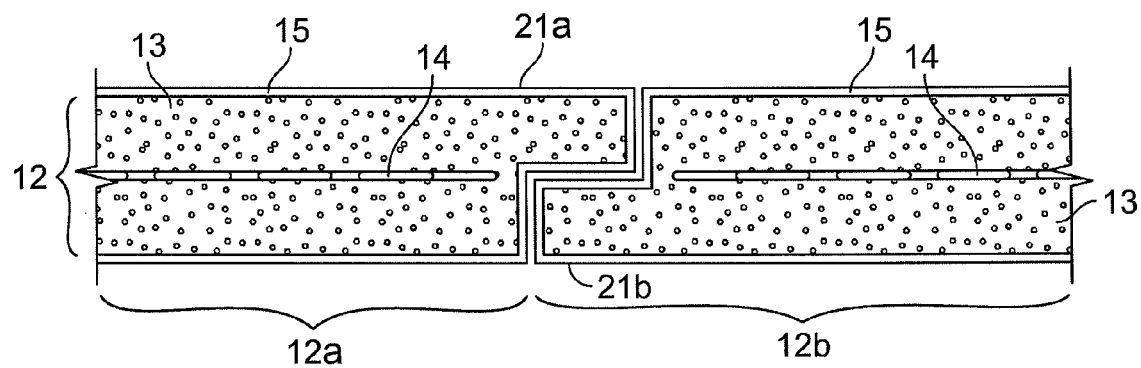
Figure 3:
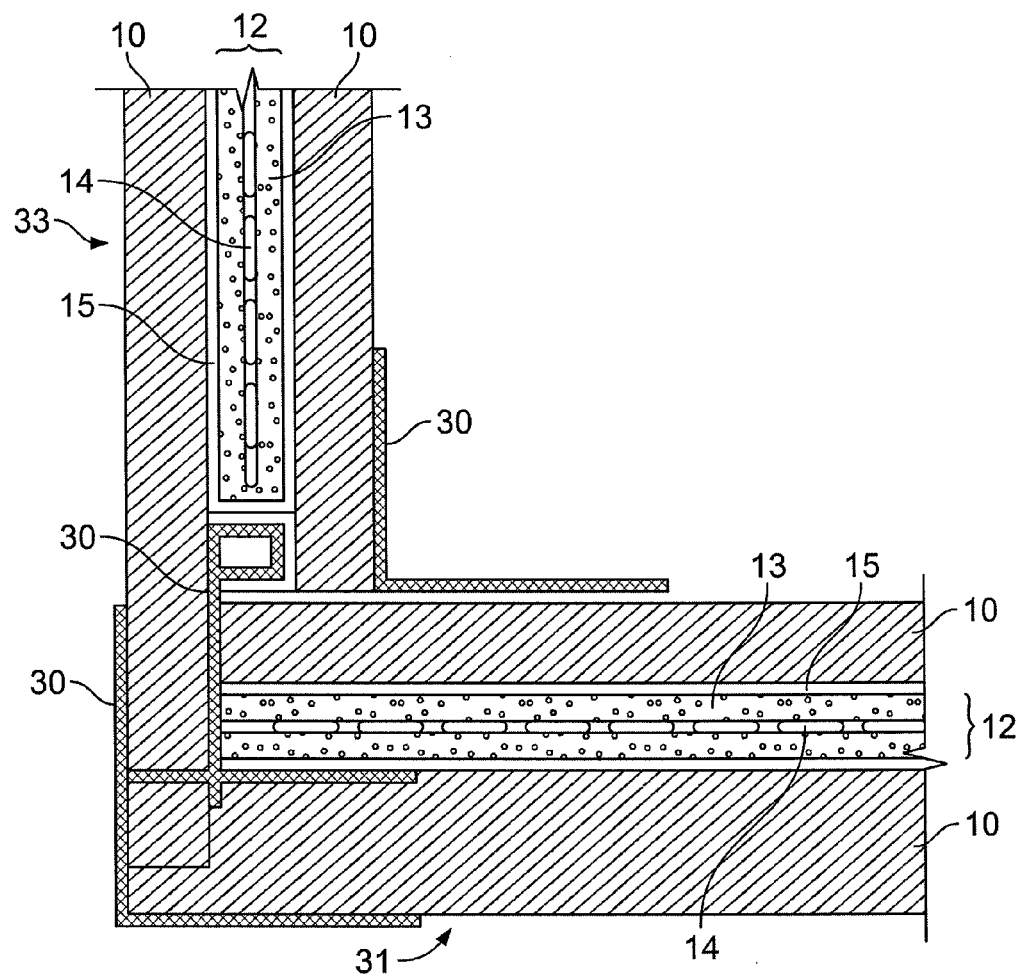

Having thus described the invention in general terms, reference will now be made to the accompanying drawings, which are not necessarily drawn to scale, and wherein:

FIG. 1 is a cross-sectional schematic of an insulated composite panel assembly according to one embodiment of the present invention;

FIG. 2 is a cross-sectional schematic of a pair of interlocking vacuum-sealed component elements connected to form at least a portion of the vacuum-sealed insulating panel, according to one embodiment of the present invention; and FIG. 3 is a cross sectional schematic of two insulated composite panel assemblies operably engaged with one another via at least one bracket, according to one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The singular forms "a," "an," and "the" include plural referents unless the context clearly dictates otherwise.

Although the preferred embodiments of the invention described herein are directed to an insulated composite panel assembly for a refrigerated truck body, it will be appreciated by one skilled in the art that the invention is not so limited. For example, aspects of the insulated composite panel assembly design of the present invention can also be incorporated into refrigerated trailers, refrigerated containers, refrigerated boxcars, mobile refrigerated storage units, and/or other insulated structures.

Referring to FIG. 1, one embodiment of the present invention provides an insulated composite panel assembly 1 comprising, a first composite panel 10a and a second composite panel 10b disposed substantially parallel to and spaced apart from the first composite panel 10a. The assembly 1 further comprises at least one vacuum-sealed insulating panel 12 operably engaged between the first composite panel 10a and the second composite panel 10b. As shown in FIG. 1, the vacuum-sealed insulating panel 12 comprises a desiccant material 14 (such as, for example, at least one silica gel packet) disposed therein such that an insulating capacity of the vacuum-sealed insulating panel 12 is less likely to degrade substantially over the course of the product life of the panel 12. The desiccant material 14 may also comprise one or more getter elements configured to be capable of absorbing a variety of gasses within a substantially evacuated environment established within the vacuum-sealed insulating panel 12 so as to reduce and/or minimize the degradation of the insulating capacity of the vacuum-sealed insulating panel 12, as discussed further herein. The desiccant material 14 may comprise a variety of materials including, but not limited to: silica gel, indicating silica gel, molecular sieve, clay (montmorillonite, for example), activated carbon, and combinations thereof.

In some embodiments, the vacuum-sealed insulating panel 12 may comprise a plurality of discrete desiccant material 14 units (such as a plurality of silica gel packets, for example) disposed within a foam core material 13 as shown in FIG. 1 and described herein. In some embodiments, the desiccant material 14 may be disposed within the vacuum-sealed insulating panel 12 at selected intervals such that the desiccant material 14 is present within the insulated composite panel assembly 1 at a corresponding selected density so as to be capable of absorbing a selected amount of fluid and/or gas within the vacuum-sealed insulating panel. In some embodiments, the desiccant material 14 may be disposed within the vacuum-sealed insulating panel 12 at a density of about 1 packet (or unit) of desiccant material 14 per each 12 inch by 12 inch vacuum-sealed insulating panel 12. Furthermore, in some embodiments, the desiccant material 14 may be disposed within the vacuum-sealed insulating panel 12 at a density of about 2 packets of desiccant material 14 per each 12 inch by 12 inch vacuum-sealed insulating panel 12. Each packet of desiccant material 14 may comprise, for example, a commercially-available blend desiccant packet such as a MiniPax® "sorbent" packet available from Multisorb Technologies, Inc. of Buffalo, N.Y. In some embodiments, the desiccant material 14 may comprise a series of individual desiccant packs connected in a "strip" configuration, such as the "Packet Strip" disclosed in U.S. Pat. No. 4,957,521, which is hereby incorporated herein by reference in its entirety. Such "packet strip" embodiments of the desiccant material 14 may comprise commercially-available products including, but not limited to, StripPax® "sorbent" packets also available from Multisorb Technologies.

According to some embodiments, the vacuum-sealed insulating panel 12 comprises a foam core material 13 defining an aperture (such as an elongated channel, for example) for retaining the desiccant material 14, and a cover material 15 surrounding the foam core material 13. The foam core material 13 may include, but is not limited to: open cell polyurethane foam; polystyrene foam; carbon/silica aerogel; and combinations of such materials. Furthermore, the cover material 15 may comprise a substantially gas-impermeable material that may include, but it not limited to: a metallic film; a polymer laminate; and combinations of substantially gas-impermeable materials.

Thus, according to such embodiments, the substantially gas-impermeable material of the cover material 15 may allow for the establishment and/or maintenance of a substantial vacuum within the vacuum-sealed insulating panel 12. As one skilled in the art will appreciate, the insulation value (denoted, for example, by an R value) of some materials (such as a foam core material 13, for example) may be increased substantially by maintaining the material in an evacuated environment. Furthermore, as described herein, embodiments of the assembly 1 comprise a desiccant material 14 disposed within the foam core material 13 that is capable of absorbing moisture and/or gases within the evacuated environment established by the cover material 15 so as to prevent (and/or delay) an elevation of an internal pressure within the confines of the cover material (which may, in turn, degrade the insulating capacity (and/or R value) of the vacuum-sealed insulated panel 12). Thus, as described herein, the construction and materials of the vacuum-sealed insulating panel 12 may thus reduce and/or minimize the degradation of an insulating capacity of the vacuum-sealed insulating panel 12 over a selected period of time. For example, in some embodiments, wherein the initial R value of the vacuum-sealed insulating panel 12 may initially be substantially about 40R per inch of thickness, the R value may degrade only to substantially about 30R per inch over about 25 years.

As shown generally in FIG. 2, in some assembly 1 embodiments, the vacuum-sealed insulating panel 12 may comprise a plurality of discrete vacuum-sealed component elements 12a, 12b. The vacuum-sealed component elements 12a, 12b may comprise, for example, a plurality of superinsulator "bricks" having a selected R value that may include, but is not limited to: R10, R15, R20, R25, R30, R35, R40, R45 and R50 wherein the R value is provided on a per inch of panel 12 thickness. For example, the vacuum-sealed insulating panel 12 (and/or component elements 12a, 12b, thereof) may comprise ThermoCor insulating panels, commercially available from AcuTemp of Dayton, Ohio. In some embodiments, the vacuum-sealed insulating panel 12 (and/or component elements 12a, 12b, thereof) may comprise vacuum insulating panels commercially available from Thermal Visions, Inc. of Granville, Ohio. Such panels may be characterized by an R value of substantially about 45R per inch of panel 12 thickness.

In some assembly 1 embodiments, the R value of various points within the panel assembly 1 may be varied by utilizing vacuum-sealed component elements 12a, 12b having a variety of different individual R value ratings. As one skilled in the art will appreciate, the R value of independent vacuum sealed components 12a, 12b may be effectively varied by selecting: different foam core materials 13; different relative thicknesses of the foam core materials 13, different desiccant materials 14, different relative amounts of desiccant materials 14; and/or combinations of such selections. Also, as shown in FIG. 2, each of the plurality of vacuum-sealed component elements 12a, 12b may define at least one channel and at least one tab 21a, 21b such that the plurality of vacuum-sealed component elements 12a, 12b may be operably engaged to form the vacuum-sealed insulating panel 12 by inserting the at least one tab 21a, 21b of a first vacuum sealed component 12a into a corresponding channel of a second vacuum sealed component 12b. Thus, each of the plurality of vacuum-sealed component elements 12a, 12b may be interlocked to form a substantially-continuous vacuum-sealed insulating panel 12.

According to various embodiments of the present invention, the first composite panel 10a and the second composite panel 10b may comprise various types of composite structural materials that may include, but are not limited to: fiber reinforced polymer materials; fiber reinforced polymer composites; solid laminates; pultruded or vacuum-infused sandwich panels (e.g., a panel having upper and lower skins with a core therebetween); pultruded panels (e.g., a panel having upper and lower skins with vertical or diagonal webs therebetween) and combinations of such composite structural materials. Exemplary core materials may include, but are not limited to: wood, foam, and various types of honeycomb. Exemplary polymer resin materials may include but are not limited to: thermosetting resins (such as unsaturated polyesters, for example), vinyl esters, polyurethanes, epoxies, phenolics, and mixtures thereof. The fiber reinforcing elements may comprise E-glass fibers, although other reinforcing elements such as S-glass, carbon aromatic polyamides, polybenzamidazoles, and aromatic polyimides), and other organic fibers (e.g., polyethylene and nylon) may also be used. Blends and hybrids of such materials may also be used as reinforcing elements. Other suitable composite materials that may be used as the reinforcing element include whiskers and fibers constructed of boron, aluminum silicate, or basalt. Exemplary composite panels 10a, 10b and methods of making such panels are disclosed in the following U.S. patents: U.S. Pat. Nos. 5,794,402; 6,023,806; 6,044,607; 6,108,998; 6,645,333; and 6,676,785, all of which are incorporated herein in their entirety. In addition, according to some embodiments, the structural components of the present invention (such as the first and second composite panels 10a, 10b, for example) may also comprise a pultruded sandwich panel having a core and two laminated skins secured to opposite sides of the core. An exemplary commercial embodiment of a suitable sandwich panel is the TRANSONITE® composite panels available from Martin Marietta Composites of Raleigh, N.C. According to some embodiments, the core of the sandwich panel may be formed of a foam material with a plurality of fibers extending through the foam and connecting the two laminated skins secured to each opposing surface of the foam core. Furthermore, some assembly 1 embodiments of the present invention may further comprise a polyurethane coating material 17 disposed on an outer side of at least one of the first composite panel 10a and the second composite panel 106 for substantially sealing the assembly 1 and to reduce the chance of fluid ingress into the assembly 1.

In order to form a unitary assembly 1, some embodiments of the present invention may comprise an adhesive layer (not shown) disposed between the vacuum-sealed insulating panel 12 and at least one of the first composite panel 10a and the second composite panel 10b for operably engaging the composite panels 10a, 10b with the vacuum sealed insulating panel 12. According to some such embodiments, the adhesive layer may comprise a methacrylate adhesive. In other embodiments, the adhesive layer may comprise a layer of contact adhesive (such as a spray-on contact adhesive, for example). Furthermore, such an adhesive layer may be disposed between one or more of the composite panels 10a, 10b, the vacuum-sealed insulating panel 12, and/or a structural bracket 30 (as described herein with respect to FIG. 3, for example) for forming a complete and/or substantially continuous insulated container (such as a refrigerated truck body, for example).

As shown in FIG. 3, the insulated composite panel assembly may further comprise one or more brackets 30 extending substantially perpendicularly from at least one edge of the insulated composite panel assembly (and/or one or more of the composite panels 10, 10b thereof) for receiving a side wall member 33 adapted to extend substantially perpendicularly from a complementary insulated composite panel assembly serving as a floor 31. As shown generally in FIG. 3, the side wall member 33 may comprise a corresponding insulated composite panel assembly. According to various embodiments, the bracket 30 may be integrally formed with the insulated composite panel assembly and/or adhered (via a methacrylate and/or contact adhesive layer, for example) to one or more of the assembly components to form a substantially perpendicular junction between two insulated composite panel assemblies.

For example, as shown in FIG. 3, embodiments of the present invention may provide an insulated structure and/or insulated enclosure including, for example, a floor 31 comprising the insulated composite panel assembly (see FIG. 1, for example) and at least one wall member 33 comprising the insulated composite panel assembly. As described herein, the wall member 33 may be operably engaged with the floor member 31 to form a structural junction and/or other portion of an insulated structural assembly. According to some embodiments, a complete insulated structure (such as a truck body or refrigerated trailer) may be formed using various insulated composite panel assemblies as structural components including, but not limited to: floors 31, wall members 33, roof members (not shown), front walls (not shown), rear walls (not shown), and/or doors (not shown). As shown in FIG. 3, the floor 31 may be provided with composite panels 10 having a thickness that is greater than that of corresponding composite panels 10 forming the outermost layers of the wall member 33 such that the load-bearing capacity of the floor 31 is correspondingly greater than that of the wall member 33. As shown in FIG. 3, the insulated structure may be joined using a bracket 30. According to various embodiments, the bracket 30 may also comprise a relatively lightweight (compared to metal frames used in conventional insulated structures, for example) composite material that may include, but is not limited to: a pultruded tubing material; an extruded composite tubing; a composite tubing material comprising a polyurethane matrix and a plurality of E-glass fibers disposed within the polyurethane matrix; and combinations of such materials.

Various embodiments of the present invention may also provide a substantially complete insulated enclosure comprising a floor 31, a plurality of wall members (see element 33, for example) operably engaged with the floor 31, and a roof (not shown) operably engaged with the wall members 33. According to some such embodiments, each of the floor 31, the wall members 33, and the roof may comprise an insulated composite panel assembly 1, as shown generally in FIG. 1. Furthermore, some embodiments may further comprise a cargo vehicle and/or cargo vehicle component comprising the insulated enclosure described herein, wherein the insulated enclosure may include, but is not limited to: a truck body; a trailer body; a shipping container; a boxcar body; and combinations of such enclosures.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An insulated composite panel assembly comprising:
a first composite panel;
a second composite panel disposed substantially parallel to and spaced apart from the first composite panel; and
a vacuum-sealed insulating panel operably engaged between the first composite panel and the second composite panel, the vacuum-sealed insulating panel comprising:
a foam core material defining an elongated channel, the elongated channel extending substantially along a length of the foam core; and
a desiccant material retained within the elongated channel, the desiccant material being disposed in discrete units positioned spaced apart from each other in the elongated channel, the desiccant material being configured to absorb gas or fluid within the foam core material.

2. An insulated composite panel assembly according to claim 1, wherein the vacuum-sealed insulating panel comprises a plurality of interlocking vacuum-sealed component elements.

3. An insulated composite panel assembly according to claim 2, wherein each of the plurality of vacuum-sealed component elements defines at least one channel and at least one tab such that the plurality of vacuum-sealed component elements may be operably engaged to form the vacuum-sealed insulating panel by inserting the at least one tab of a first vacuum sealed component into a corresponding at least one channel of a second vacuum sealed component.

4. An insulated composite panel assembly according to claim 1, wherein the vacuum-sealed insulating panel comprises: a cover material independent of the first and second composite panels and surrounding the foam core material.

5. An insulated composite panel assembly according to claim 4, wherein the foam core material comprises at least one of:
open cell polyurethane foam;
polystyrene foam; or
carbon/silica aerogel.

6. An insulated composite panel assembly according to claim 4, wherein the cover material comprises a substantially gas-impermeable material.

7. An insulated composite panel assembly according to claim 6, wherein the substantially gas-impermeable material comprises at least one of:
a metallic film; or
a polymer laminate.

8. An insulated composite panel assembly according to claim 1, wherein at least one of the first composite panel and the second composite panel comprises at least one of:
a fiber reinforced polymer material;
a fiber reinforced polymer composite; or
a solid laminate.

9. An insulated composite panel assembly according to claim 8, wherein the fiber reinforced polymer composite comprises at least one of:
a pultruded sandwich panel comprising an upper skin and a lower skin and a core disposed substantially between the upper and lower skins;
a vacuum-infused sandwich panel comprising an upper skin and a lower skin and a core disposed substantially between the upper and lower skins; or
a pultruded panel comprising an upper skin and a lower skin and a web material disposed substantially between the upper and lower skins.

10. An insulated composite panel assembly according to claim 1, wherein the desiccant material comprises at least one silica gel packet.

11. An insulated composite panel assembly according to claim 1, further comprising an adhesive layer disposed between the vacuum-sealed insulating panel and at least one of the first composite panel and the second composite panel.

12. An insulated composite panel assembly according to claim 11, wherein the adhesive layer comprises a methacrylate adhesive.

13. An insulated composite panel assembly according to claim 11, wherein the adhesive layer comprises a contact adhesive.

14. An insulated composite panel assembly according to claim 1, further comprising a polyurethane coating material disposed on an outer side of at least one of the first composite panel and the second composite panel.

15. An insulated composite panel assembly according to claim 1, further comprising at least one bracket extending substantially perpendicularly from at least one edge of the insulated composite panel assembly, for receiving a side wall adapted to extend substantially perpendicularly from the insulated composite panel assembly.

16. An insulated composite panel assembly according to claim 15, wherein the at least one bracket is integrally formed with the insulated composite panel assembly.

17. An insulated composite panel assembly according to claim 15, wherein the at least one bracket comprises at least one of:
   a pultruded tubing material;
   an extruded composite tubing; or
   a composite tubing material comprising a polyurethane matrix and a plurality of E-glass fibers disposed within the polyurethane matrix.

18. An insulated composite panel assembly according to claim 1, wherein the elongated channel is disposed substantially parallel to the first and second composite panels.

19. An insulated composite panel assembly according to claim 1, wherein the desiccant material comprises about 1 to 2 units of desiccant material per each 12 inch by 12 inch vacuum-sealed insulating panel.

20. A cargo vehicle comprising the insulated composite panel assembly according to claim 1.

21. An insulated structure comprising:
   a floor member comprising the insulated composite panel assembly according to claim 1; and at least one wall member comprising the insulated composite panel assembly according to claim 1, the at least one wall member being operably engaged with the floor member to form the insulated structure.

22. An insulated enclosure comprising:
   a floor;
   a plurality of wall members operably engaged with the floor; and
   a roof operably engaged with the wall members, wherein each of the floor, the wall members, and the roof comprise an insulated composite panel assembly according to claim 1.

23. A cargo vehicle comprising the insulated enclosure of claim 22.

24. A cargo vehicle according to claim 23, wherein the insulated enclosure is selected from the group consisting of:
   a truck body;
   a trailer body;
   a shipping container; and a boxcar body.

* * * * *